(12) United States Patent
Calmes

(10) Patent No.: US 10,400,461 B2
(45) Date of Patent: Sep. 3, 2019

(54) FORM LINER WITH OBJECT SEALANT

(71) Applicant: Advanced Formliners, LLC, Onalaska, WI (US)

(72) Inventor: Shane Calmes, Onalaska, WI (US)

(73) Assignee: Advanced Formliners, LLC, Onalaska, WI (US)

(*) Notice: Subject to any disclaimer, the term of this patent is extended or adjusted under 35 U.S.C. 154(b) by 0 days.

(21) Appl. No.: 15/853,711

(22) Filed: Dec. 23, 2017

(65) Prior Publication Data

US 2018/0187056 A1  Jul. 5, 2018

Related U.S. Application Data

(60) Provisional application No. 62/439,002, filed on Dec. 24, 2016.

(51) Int. Cl.
| | | |
|---|---|---|
| *E04G 9/10* | (2006.01) | |
| *C09J 7/30* | (2018.01) | |
| *C09J 191/00* | (2006.01) | |
| *C09J 7/20* | (2018.01) | |

(52) U.S. Cl.
CPC ...... *E04G 9/10* (2013.01); *C09J 7/20* (2018.01); *C09J 7/30* (2018.01); *C09J 191/00* (2013.01); *C09J 2201/28* (2013.01); *C09J 2491/00* (2013.01); *C09J 2499/00* (2013.01)

(58) Field of Classification Search
CPC ..................................... E04G 9/10; C09J 7/30
See application file for complete search history.

(56) References Cited

U.S. PATENT DOCUMENTS

| | | | | |
|---|---|---|---|---|
| 3,034,918 A * | 5/1962 | Cook, Jr. | ................. | B41M 5/10 8/467 |
| 3,317,178 A * | 5/1967 | Kreier, Jr. | ............... | B28B 7/348 106/38.25 |
| 3,602,476 A * | 8/1971 | Iragorri | ............... | B28B 19/0061 249/15 |
| 4,420,525 A * | 12/1983 | Parks | .................... | B28B 7/0064 264/245 |
| 5,098,059 A * | 3/1992 | Sawyer | .................... | E04G 9/05 249/112 |
| 5,900,180 A * | 5/1999 | Scott | .................... | B28B 19/0061 249/61 |
| 6,041,567 A * | 3/2000 | Passeno | .............. | B28B 19/0061 249/96 |
| 6,117,495 A * | 9/2000 | Hanson | .................... | B29C 33/58 427/133 |
| 6,192,964 B1 * | 2/2001 | Cianci | .................... | B29C 63/044 160/168.1 R |
| 6,360,505 B1 * | 3/2002 | Johns | .................... | E04F 13/147 249/15 |
| 6,858,285 B1 * | 2/2005 | Hamilton | ................. | B32B 3/28 428/174 |
| 7,871,054 B2 * | 1/2011 | Walters | ............... | B28B 19/0061 249/15 |

(Continued)

*Primary Examiner* — Michael Safavi
(74) *Attorney, Agent, or Firm* — Vidas, Arrett & Steinkraus, PA

(57) ABSTRACT

In some embodiments, a formliner comprises a body comprising a defining a plurality of cavities arranged in a repeating pattern. A sealant is provided in each cavity. The sealant comprises a gel mixture of wax and vegetable oil. In some embodiments, the wax comprises carnauba wax and/or beeswax.

20 Claims, 6 Drawing Sheets

(56) References Cited

U.S. PATENT DOCUMENTS

| | | | | |
|---|---|---|---|---|
| 8,888,067 B1* | 11/2014 | Calmes | ................ | B28B 7/0073 |
| | | | | 249/15 |
| 2002/0100241 A1* | 8/2002 | Rygiel | ................. | B28B 7/0073 |
| | | | | 52/561 |
| 2006/0046342 A1* | 3/2006 | Karg | ................... | H01L 51/0004 |
| | | | | 438/82 |
| 2006/0180731 A1* | 8/2006 | Scott | ................... | B28B 19/0061 |
| | | | | 249/15 |
| 2010/0072346 A1* | 3/2010 | Fitzgerald | ............ | B28B 7/0073 |
| | | | | 249/16 |
| 2012/0159880 A1* | 6/2012 | Veilleux | ............... | C03C 27/048 |
| | | | | 52/204.62 |

* cited by examiner

FORM LINER WITH OBJECT SEALANT

CROSS-REFERENCE TO RELATED APPLICATIONS

This Application claims the benefit of U.S. Provisional Patent Application No. 62/439,002, filed Dec. 24, 2016, which is hereby incorporated herein by reference in its entirety.

BACKGROUND OF THE INVENTION

This invention relates generally to form liners suitable for laying out cured panels having embedded objects, and more specifically to a sealant suitable for sealing a face of such embedded objects during curing, and a form liner comprising such a sealant.

Cured walls having embedded objects such as thin bricks are generally known. Also known are form liner panels that aid in positioning objects before concrete or another curable material is introduced and cured.

A known problem with embedding objects is the unwanted migration of concrete onto the face of the embedded objects during the curing process. One method of attempting to prevent such migration is to seal the face of the embedded objects during the curing process with a wax. The wax protects the face portions of the objects, but concrete is often still able to flow beneath the objects during the curing process. After curing, the wax must be removed from the face of the objects, as well as any unwanted, migrated concrete. The wax removal process is generally difficult and labor intensive, typically requiring the use of a power washer and high pressure spray at temperatures above 200 degrees F. Further, if a large amount of concrete causes an object to move enough that it is not aligned with the other objects, the misaligned objects must be individually cut out and replaced.

Some examples of form liner panels designed to limit the migration of curable materials are disclosed in U.S. Pat. No. 8,888,067, the entire disclosure of which is hereby incorporated herein by reference.

There remains a need for a method of forming a cured wall having embedded objects where the embedded objects are protected during the curing process. There remains a need for form liner panels capable of holding objects in place during a curing process. There remains a need for methods of protecting embedded objects that do not require steam and high temperatures to remove the protectant.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a formliner comprises a body comprising a defining a plurality of cavities arranged in a repeating pattern. A sealant is provided in each cavity. The sealant comprises a gel mixture of wax and vegetable oil. In some embodiments, the wax comprises carnauba wax and/or beeswax.

In some embodiments, the cavities are defined by raised portions that comprise sidewalls, and the sealant does not contact the sidewalls.

In some embodiments, a plurality of deposits of sealant are provided on the base portion of each cavity. In some embodiments, the plurality of deposits extends around an inner perimeter of the base portions.

In some embodiments, the sealant comprises a filler such as talc or flour. In some embodiments, the sealant comprises a preservative. In some embodiments, the sealant comprises a thinning agent such as propylene glycol.

In some embodiments, a formliner comprises a body comprising a plurality base portions and a plurality of raised portions defining a plurality of cavities. The cavities are arranged in a running bond brick pattern and the raised portions comprise row members and column members. A sealant gel is oriented in each cavity in contact with the base portion of the cavity. In some embodiments, the sealant gel comprises a mixture of beeswax, carnauba wax and vegetable oil. In some embodiments, the sealant gel further comprises a filler and a thinning agent.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
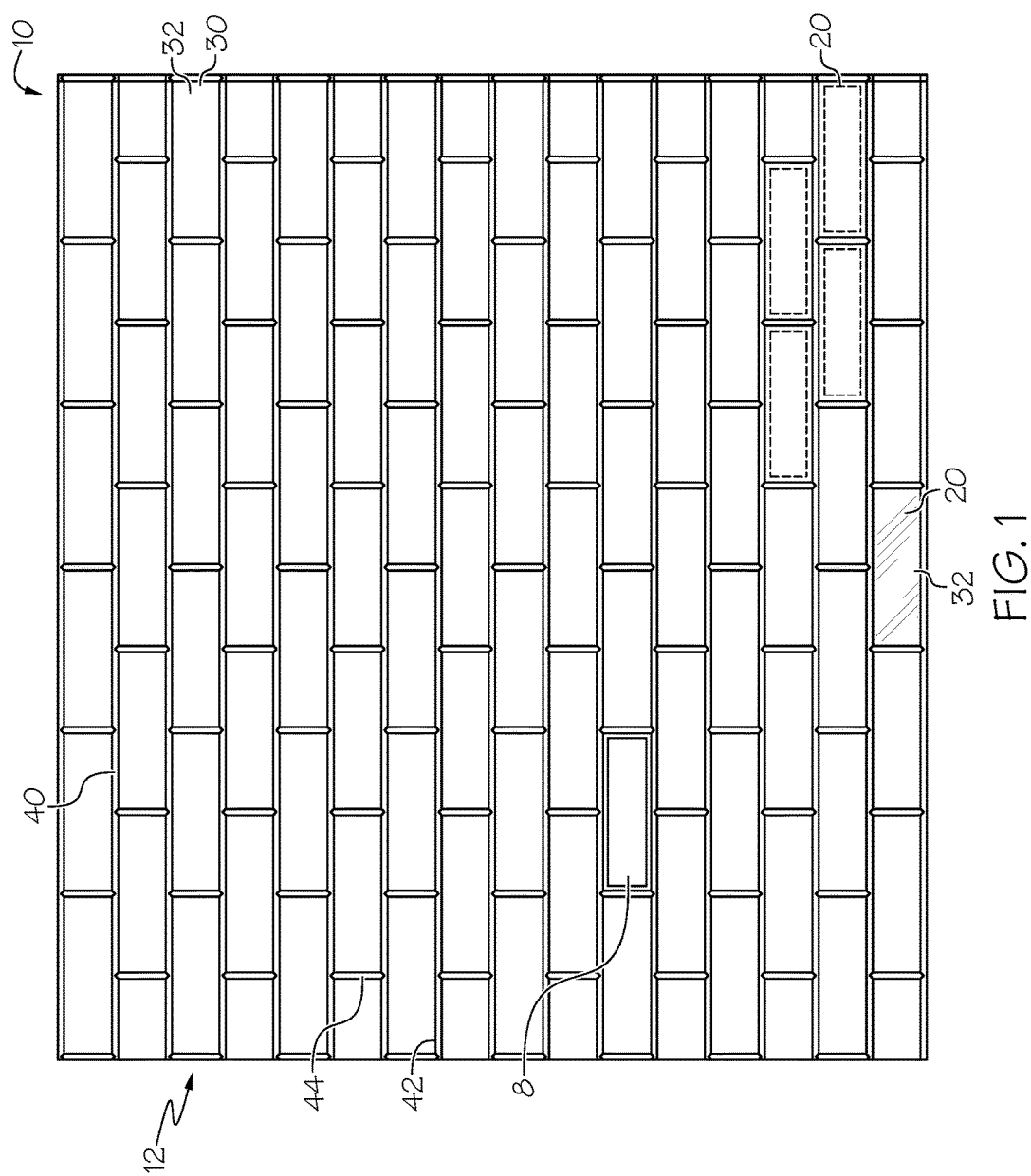
FIG. 1 shows a top view an embodiment of a form liner provided with a sealant.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

Figure 2:
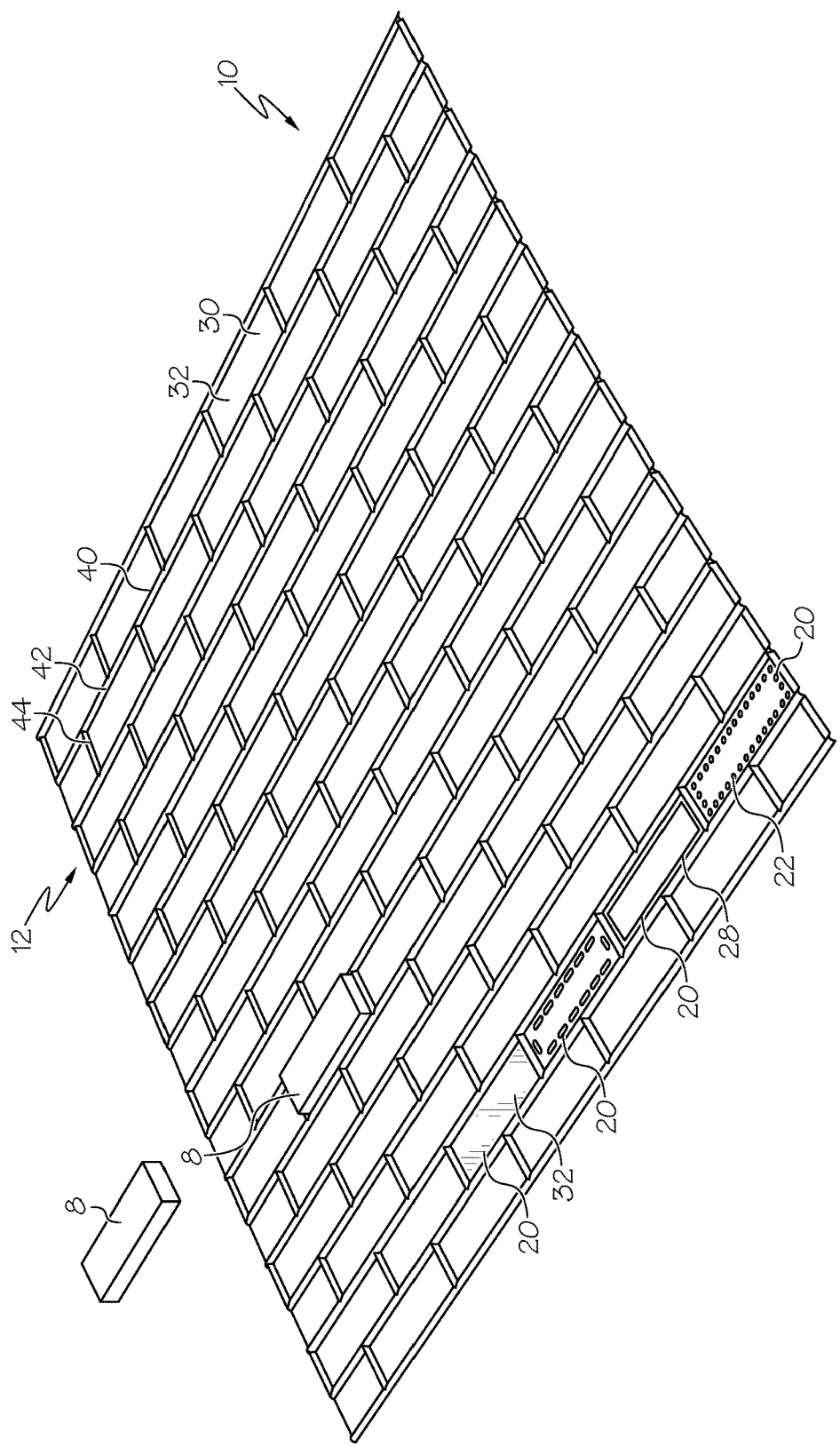
FIG. 2 shows an angled view an embodiment of a form liner provided with a sealant.
Figure 3:
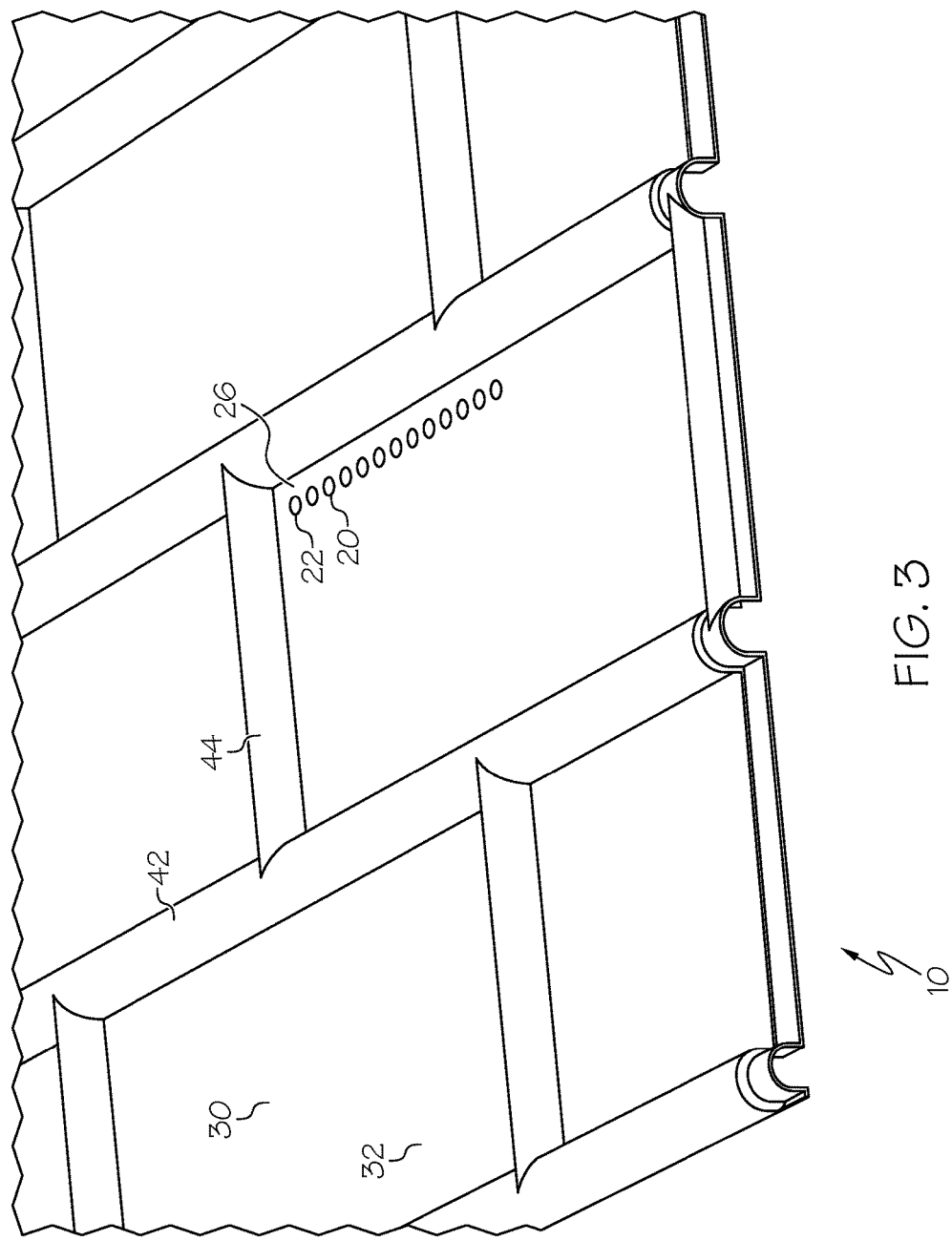
FIG. 3 shows a detail of a portion of a form liner.

FIG. 1 shows an embodiment of a form liner 10 that defines a plurality of cavities 30. FIG. 2 shows another view of an embodiment of a form liner 10. FIG. 3 shows a portion of an embodiment of a form liner 10 in greater detail.

Desirably, the form liner 10 is suitable to be used as formwork for creating a cured object, such as a concrete wall. Desirably, each cavity 30 is suitable for receiving an object 8 that will become embedded in the cured wall. Concrete can be poured over the objects and allowed to cure, thereby forming a panel having embedded objects 8. The form liner 10 is then removed.

U.S. Pat. Nos. 8,852,724 and 8,888,067, and U.S. Publication No. 2013/0075576 disclose some examples of cavity patterns in formliners, and are hereby incorporated herein by reference in their entireties.

In some embodiments, a form liner 10 can create a cured wall having decorative three dimensional patterns. In some embodiments, a resulting wall can have an appearance similar to traditional built-up walls, such as concrete, stone and or masonry walls. A form liner 10 can have any suitable shape and any suitable pattern of cavities 30 formed therein. FIG. 1 shows a pattern of cavities 30 arranged in rows 12, wherein cavities 30 of adjacent rows 12 are offset from one another to create a traditional brick running bond pattern.

In some embodiments, a form liner 10 comprises a plurality of base portions 32 separated by a plurality of raised portions 40. In some embodiments, a base portion 32 defines a floor of a cavity 30. In some embodiments, a cavity 30 is defined by a base portion 32 and a plurality of raised portions 40. In some embodiments, the raised portions 40 extend around a perimeter of a cavity 30. A cavity 30 can have any suitable shape and be of any suitable size. Raised portions 40 can also be of any suitable size and shape.

In some embodiments, the raised portions 40 comprise an arcuate surface and can further comprise surface texturing. In some embodiments, a raised portion 40 is arranged to create the appearance of a mortar joint in a curable material that cures in contact with the raised portion 40.

In some embodiments, the raised portions 40 comprise row members 42 and column members 44 arranged in a repeating pattern. In some embodiments, the cavities 30 have a similar size and shape. In some embodiments, cavities 30 of a similar shape are arranged in a repeating pattern.

In some embodiments, the cavities 30 of adjacent rows 12 are offset from one another to form a running bond pattern as shown in FIG. 1. In other embodiments, cavities 30 can be arranged in any other suitable patterns, such as known brick orientation patterns.

An American bond pattern (not illustrated) can comprise several rows 12 similar to a running bond pattern, but can include one row 12 in every six rows 12 formed from half-size cavities 30 (half-bricks). The column members 42 located between half-size cavities 30 can be offset from the column members 42 of adjacent rows 12.

A stack bond pattern (not illustrated) can comprise cavities 30 that are aligned in both horizontal and vertical directions.

A one-third bond pattern (not illustrated) can comprise cavities 30 of adjacent rows 12 that overlap by ⅓ with one adjacent cavity and by ⅔s with another adjacent cavity.

In some embodiments, a least one cavity 30 is provided with a sealant 20. A sealant 20 can be placed in and/or around a cavity 30 in order to seal a surface of an object 8. For example, the sealant 20 can protect the face of an object 8 by comprising a barrier that prevents curable material from contacting or bonding with the face of the object 8.

In some embodiments, an entire base portion 32 of a cavity 30 is coated with the sealant 20.

In some embodiments, a bead 28 of sealant 20 is applied around a perimeter of a cavity 30. In some embodiments, the weight of an object placed in the cavity 30 will compress the sealant against the base portion 32, changing the shape of any deposits of sealant 20.

In some embodiments, a plurality of dots 22 or individual deposits 22 of sealant 20 are positioned around a perimeter of a cavity 30.

In some embodiments, a formliner 10 is provided with sealant 20 oriented in the cavities 30, and the sealant 20 does not contact any raised portion. In some embodiments, no sealant 20 is applied to any raised portion 40.

In some embodiments, deposits 22 of sealant are applied having a gap 26 between the deposit 22 and a sidewall of the cavity 30. In some embodiments, a gap 26 is at least ¹⁄₁₆ inch. In some embodiments, a gap 26 of approximately ⅛ inch is provided between the deposit 22 and a sidewall of the cavity 30. In some embodiments, deposits 22 of sealant are applied having a height dimension of at least ¹⁄₁₆ inch. In some embodiments, deposits 22 of sealant are applied having a height dimension between approximately ⅛ inch and ¼ inch. In some embodiments, deposits 22 of sealant 20 have a diameter of approximately ⅜ inch to ¼ inch at a base of the deposit 22.

In some embodiments, deposits 22 of sealant 20 are applied having a predetermined gap 26 between the deposit 22 and a sidewall of the cavity 30, and having a height dimension ranging from being equal to the distance of the predetermined gap 26 to being twice the predetermined gap 26.

In some embodiments, each cavity 30 is provided with a similar pattern of sealant 20. In some embodiments, each cavity 30 having a first shape is provided with a first pattern of sealant 20, and each cavity having a second shape is provided with a second pattern of sealant 20. In some embodiments, a first shape comprises a standard repeating cavity shape. In some embodiments, cavities 30 having a second shape can be located at side edges of the formliner 10, for example comprising half-size cavities 30 where the edge of the formliner 10 interrupts the repeating bond pattern.

In some embodiments, the sealant 20 forms a continuous barrier that extends about a perimeter of a surface of an object. In some embodiments, the barrier creates suction that holds the object in the cavity 30 and prevents migration of curable material onto a face surface of the object. This helps to hold all of the objects in their correct location, for example having face portions aligned on a common plane.

In some embodiments, deposits 22 of sealant 20 are provided at appropriate sizing and spacing such that the weight of an object 8 placed into a cavity 30 upon the deposits 22 will deform the deposits 22. Desirably, the deposits 22 deform enough to contact adjacent deposits 22 and form a continuous perimeter around the face of the object 8.

Desirably, the sealant 20 is capable of sufficiently sealing and/or sticking to the object 8 to prevent concrete migration, but also capable of being easily removed. Desirably, a melt temperature of the sealant 20 is higher than temperatures reached by the concrete and form liner 10 during the curing process. In some embodiments, the sealant 20 has a melt temperature that is considered low for the purposes of removal of the sealant 20 from the object, for example 140-160 degrees F. In some embodiments, a melting temperature of the sealant 20 is greater than 160 degrees F. In some embodiments, the sealant 20 is not required to melt to be washed off of objects, and pressure washing with cold water is sufficient to remove sealant 20 from the face of the objects 8.

In some embodiments, a sealant 20 comprises a mixture of wax and oil. In some embodiments, the sealant 20 comprises approximately equal parts wax and oil. In some embodiments, the wax portion of the sealant 20 comprises a mixture of carnauba wax and beeswax. Using more carnauba wax than beeswax typically increases melt temperature, while using more beeswax than carnauba wax typically decreases melt temperature.

In some embodiments, the wax portion of the sealant 20 is provided at a ratio of two parts beeswax to one part carnauba wax by weight. In some embodiments, this mixture of wax, totaling three parts of wax, is combined with three parts oil by weight.

In some embodiments, the oil comprises a vegetable oil. In some embodiments, the oil comprises castor oil.

In some embodiments, mixtures of wax and oil provide a sealant 20 material having a gel-type consistency. The use of castor oil helps to prevent the sealant 20 from sticking to objects.

In some embodiments, the sealant 20 further comprises a thinning agent such as a solvent. In some embodiments, a thinning agent comprises ethylene glycol, propylene glycol, polypropylene glycol and/or mixtures thereof. In some embodiments, a thinning agent acts as an antifreeze.

In some embodiments, a thinning agent such as propylene glycol will lower the melting point of the sealant 20, allowing the sealant 20 to be removed with a pressure washer, wherein cold water can be used.

In some embodiments, the sealant 20 further comprises a filler such as talc. Any suitable filler can be used, such as various minerals, powders and mixtures thereof.

In some embodiments, a flour can be used as a filler, such as wheat flour or other suitable flours. When an organic filler is used, any suitable preservative can also be used to stabilize the organic filler. In some embodiments, a preservative comprises calcium propanoate, sodium benzoate, tricalcium phosphate, butylated hydroxyanisole, or the like.

In some embodiments, a sealant 20 is made by melting one part carnauba wax with two parts beeswax, and adding three parts castor oil to form a wax and oil mixture. In some embodiments, propylene glycol is added. In some embodiments, approximately two parts propylene glycol is provided for one part wax and oil mixture by weight.

In some embodiments, a sealant 20 comprises a gel. In some embodiments, a sealant 20 comprises wax, vegetable oil, a filler and a thinning agent. In some embodiments, a sealant 20 comprises beeswax, vegetable oil, a filler and a thinning agent. In some embodiments, a sealant 20 comprises carnauba wax, vegetable oil, a filler and a thinning agent. In some embodiments, a sealant 20 comprises carnauba wax, beeswax, vegetable oil, a filler and a thinning agent. In some embodiments, the vegetable oil comprises castor oil. In some embodiments, the filler comprises talc. In some embodiments, the filler comprises flour. In some embodiments, the thinning agent comprises propylene glycol.

In some embodiments, a method comprises providing a form liner comprising a plurality of cavities and placing a sealant into at least one cavity. In some embodiments, the sealant is placed into a plurality of the cavities. In some embodiments, the sealant is placed into each of the cavities.

In some embodiments, the invention is directed to methods of making a sealant as disclosed herein.

In some embodiments, a method comprises providing a form liner comprising a cavity and a sealant, and placing an object in the cavity in contact with the sealant. In some embodiments, the method further comprises providing a curable material.

Figure 4:
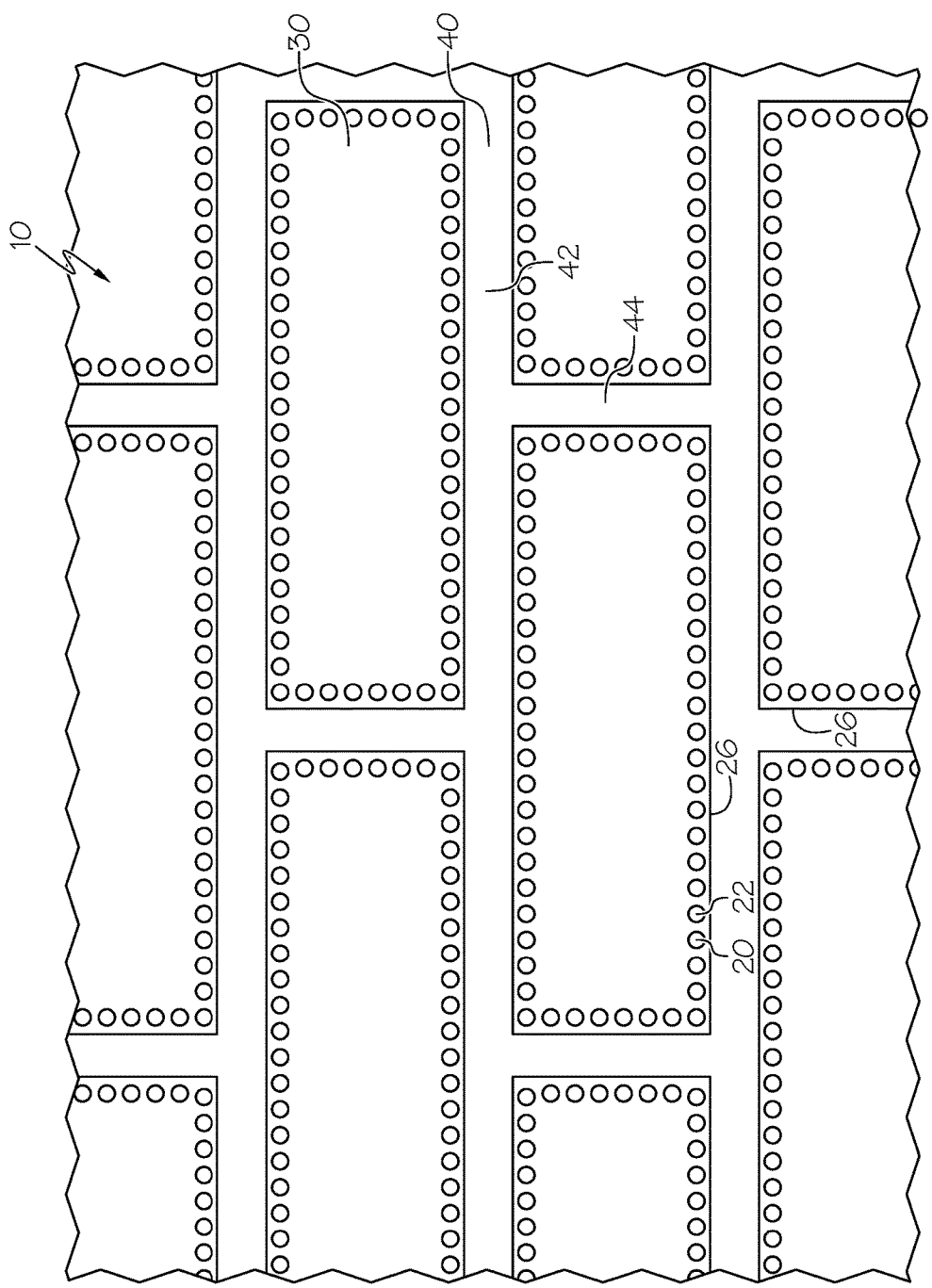
FIG. 4 shows a portion of a formliner and sealant disposed in the cavities.

FIG. 4 shows an embodiment of a formliner 10 wherein each cavity 30 comprises a plurality of deposits 22 of sealant 20 spaced around an interior perimeter of the cavity 30. In some embodiments, each deposit 22 is oriented with a gap 26 between the deposit 22 and the closest raised portion 40. In some embodiments, each similarly shaped cavity 30 comprises a similar arrangement of deposits 22 of sealant 20.

Figure 5:
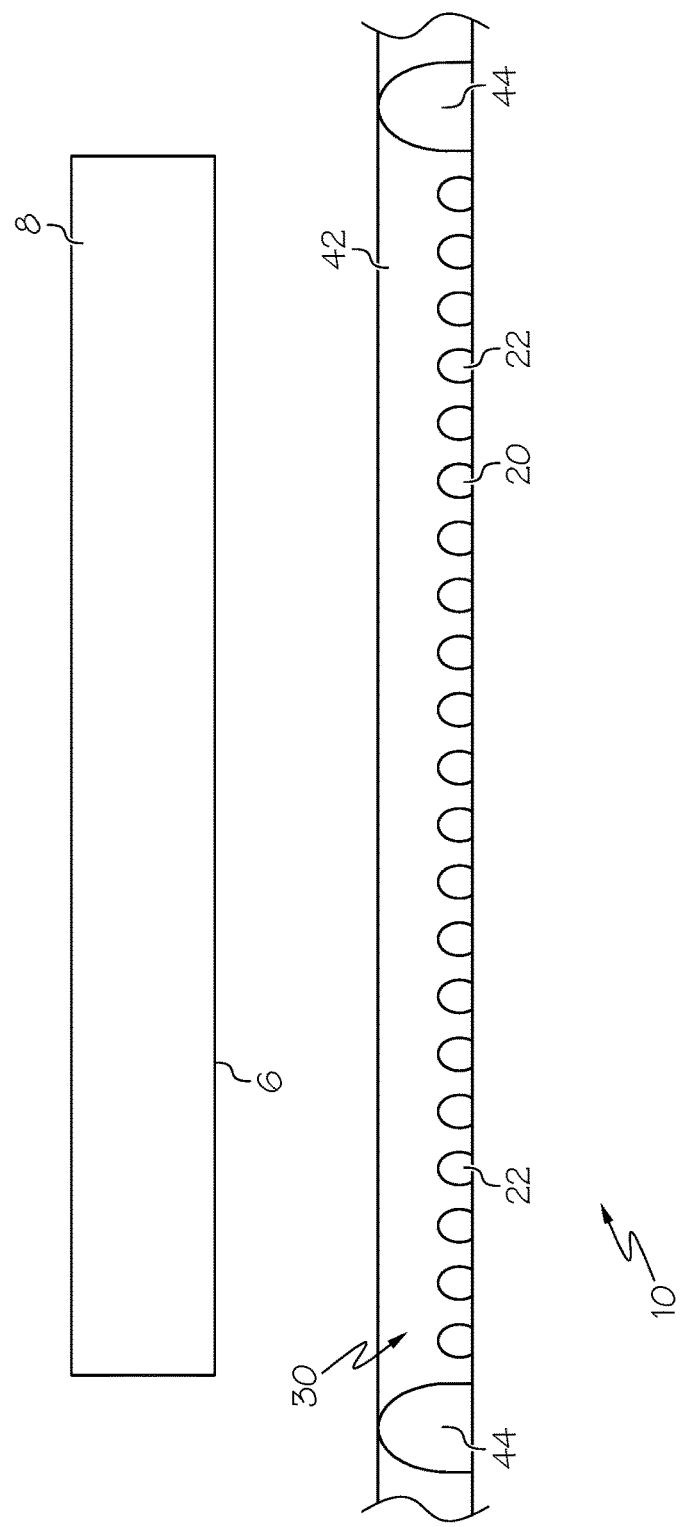
FIG. 5 shows an object adjacent to a cavity having sealant deposits.

FIG. 5 shows a portion of a formliner 10 in a section view to highlight a row of deposits 22 of sealant 20. An object 8 is being inserted into the cavity 30.

Figure 6:
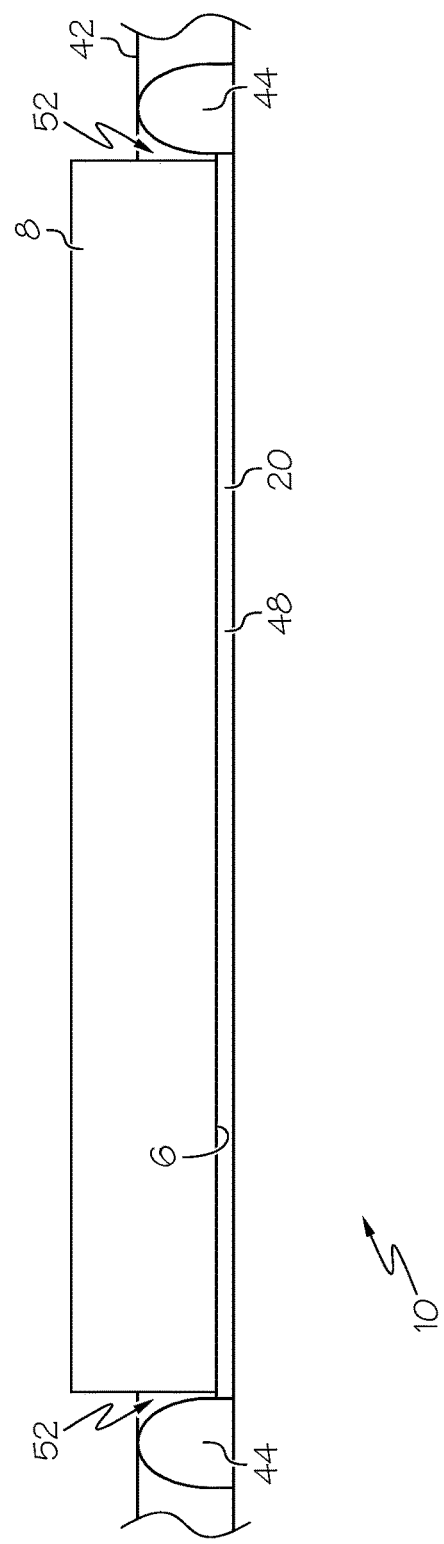
FIG. 6 shows the object of FIG. 5 oriented in the cavity with a barrier of sealant arranged to protect a face of the object.

FIG. 6 shows the content of FIG. 5 after the object 8 has been placed into the cavity 30 and upon the deposits 22 of sealant 20. The formerly individual deposits 22 of sealant 20 have each deformed and come into contact with adjacent deposits 22, transforming into a continuous barrier 48 that extends around the perimeter of the face 6 of the object 8. Desirably, the sealant 20 barrier 48 will prevent any curable material that enters the space 52 between the object 8 and a raised column 44 or raised row 42 from reaching the face 6 of the object 8.

In some embodiments, a traditional wax can also be applied to the face of an object. For example, when brick objects are used that are porous, traditional wax can be used to prevent discoloration or other interaction with the sealant 20.

In some embodiments, a method comprises providing a formliner 10 comprising a plurality of cavities 30 and applying a sealant 20 as disclosed herein to one or more cavities 30. In some embodiments, sealant 20 is provided in each cavity 30.

The above disclosure is intended to be illustrative and not exhaustive. This description will suggest many variations and alternatives to one of ordinary skill in this field of art. All these alternatives and variations are intended to be included within the scope of the claims where the term "comprising" means "including, but not limited to." Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A formliner comprising:
   a body comprising a plurality of base portions and a plurality of raised portions defining a plurality of cavities, the cavities arranged in a repeating pattern; and
   a sealant comprising wax, oil and talc, the sealant oriented in each cavity in contact with the base portion of the cavity.

2. The formliner of claim 1, wherein the sealant does not contact any of the raised portions.

3. The formliner of claim 2, wherein the sealant and a raised portion as separated by a gap of at least 1/16 inch.

4. The formliner of claim 1, wherein a plurality of deposits of sealant are provided on each base portion.

5. The formliner of claim 4, wherein a plurality of deposits extends around an inner perimeter of a base portion.

6. The formliner of claim 5, wherein a gap is provided between the plurality of deposits and the raised portions of the cavity.

7. The formliner of claim 1, wherein a layer of sealant is applied to the base portion of each cavity.

8. The formliner of claim 1, the sealant further comprising a thinning agent.

9. The formliner of claim 1, the sealant further comprising propylene glycol.

10. The formliner of claim 1, the sealant further comprising a filler.

11. The formliner of claim 1, the oil comprising vegetable oil.

12. The formliner of claim 1, the wax comprising carnauba wax.

13. The formliner of claim 1, the wax comprising beeswax.

14. The formliner of claim 13, the wax further comprising carnauba wax.

15. A formliner comprising:
   a body comprising a plurality of base portions and a plurality of raised portions defining a plurality of cavities, the cavities arranged in a repeating pattern; and
   a sealant comprising wax and oil, the sealant oriented in each cavity in contact with the base portion of the cavity;
   the sealant further comprising flour.

16. The formliner of claim 15, the sealant further comprising a preservative.

17. A formliner comprising:
   a body comprising a plurality base portions and a plurality of raised portions defining a plurality of cavities, the cavities arranged in a running bond brick pattern, the raised portions comprising row members and column members; and
   a sealant gel oriented in each cavity in contact with the base portion of the cavity, the sealant gel comprising wax and talc.

18. The formliner of claim 17, the sealant gel comprising a mixture of beeswax and carnauba wax.

19. The formliner of claim 18, the sealant gel comprising a filler and a thinning agent.

20. The formliner of claim 17, the sealant gel comprising propylene glycol.

* * * * *